J. S. SACKETT.
DEVICE FOR CLAMPING PATCHES ON TIRES.
APPLICATION FILED DEC. 13, 1912.
1,131,162. Patented Mar. 9, 1915.
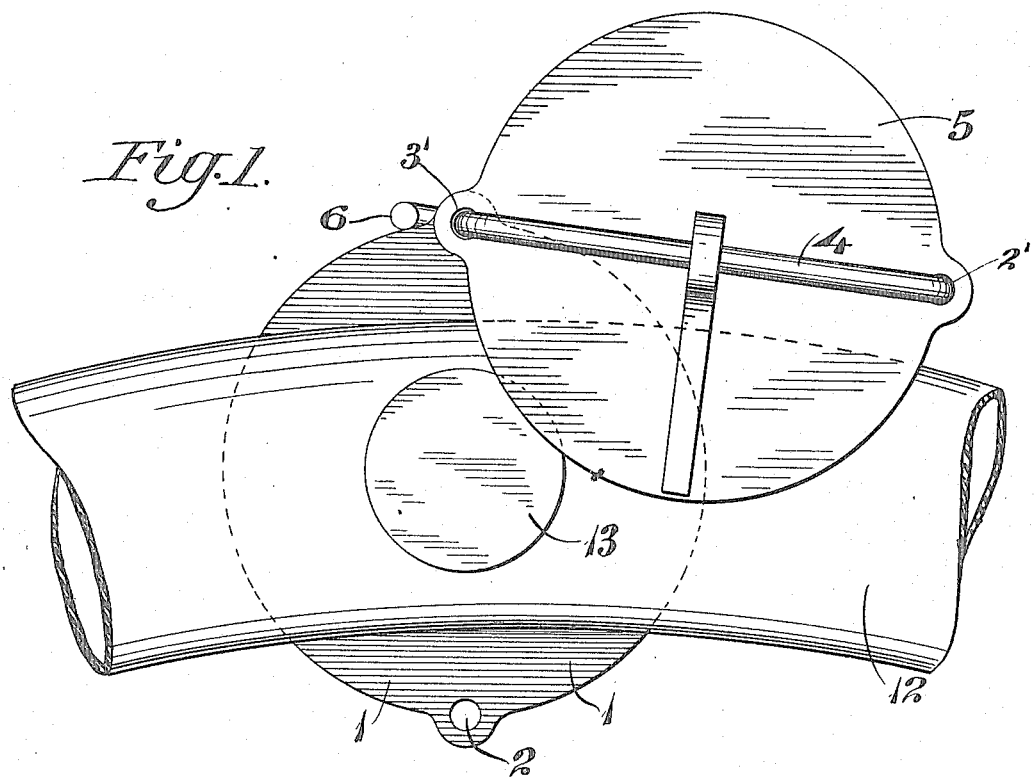
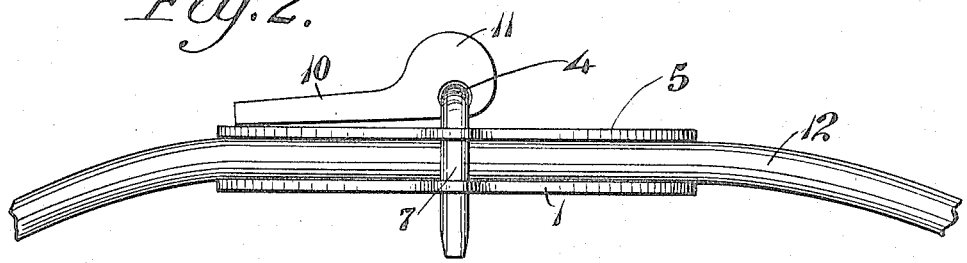
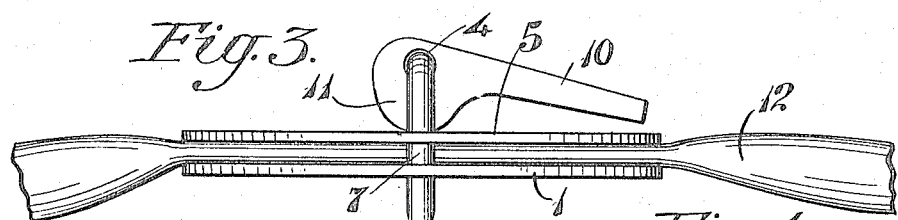
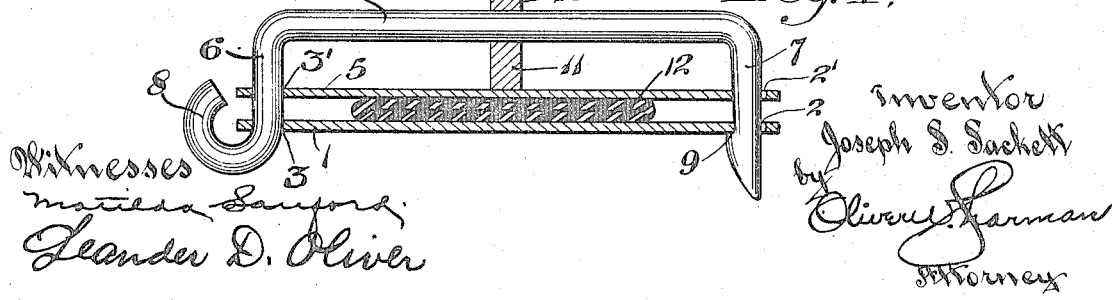

UNITED STATES PATENT OFFICE.

JOSEPH S. SACKETT, OF WILLIAMSBURG, OHIO.

DEVICE FOR CLAMPING PATCHES ON TIRES.

1,131,162.

Specification of Letters Patent.

Patented Mar. 9, 1915.

Application filed December 13, 1912. Serial No. 726,465.

*To all whom it may concern:*

Be it known that I, JOSEPH S. SACKETT, a citizen of the United States, residing at Williamsburg, in the county of Clermont and State of Ohio, have invented certain new and useful Improvements in Devices for Clamping Patches on Tires, of which the following is a specification.

My invention relates to devices for clamping patches on tires and more particularly for clamping patches on inner tubes for automobile tires.

In repairing punctures in inner tubes it is very often difficult to apply uniform pressure to a patch after placing it over the punctured portion of the tube in order to cause it to adhere properly to the tube. This difficulty is particularly experienced when it is desired to repair a puncture while on the road, where it is the usual custom to apply the pressure on the patch with the hands or anything which might be handy and adapted to answer the purpose. It is well known that if the patch does not adhere properly at all points especially around the edge it will work itself loose, due to irregularities in the pressure while applying, and the tube will have to be repaired again.

It is the object of my invention to provide a device to be used when repairing punctured tubes which will render it possible to apply absolutely uniform pressure at all points on a patch applied to a tube, and thereby insure that the patch will retain its proper position.

It is a further object of my invention to construct a device for applying patches to tubes which is simple in construction, inexpensive to manufacture, and one which takes up little space and can be readily carried about as part of the tube repairing outfit.

My invention consists of certain parts and combinations of parts as will be described in the following specification and pointed out in the appended claim.

In the accompanying sheet of drawings which serves to illustrate my invention:

Figure 1 is a plan view of my device in its open position showing an inner tube about to have a patch pressed thereon; Fig. 2 is an elevational view showing the tire in position just before the cam lever is operated to finish the clamping operation; Fig. 3 is a similar view showing the tire clamped in the device; and Fig. 4 is a cross-sectional view taken through the middle of my device showing the tube clamped therein.

Referring more particularly to the drawings 1 illustrates a lower plate having apertures 2 and 3 therein through which a tension bar 4 is adapted to pass. An upper plate 5 is provided which has apertures 2' and 3' therein through which the tension bar 4 is adapted to pass. The tension bar 4 is provided with two perpendicular ends 6 and 7 which pass through the apertures 2, 2', 3 and 3' thus allowing the plates to float perpendicularly with relation to the tension bar and to each other. The perpendicular end 6 of the tension bar 4 is provided with a curved or turned up end 8 which retains the plates on the tension bar. The other perpendicular end 7 of the tension bar is provided with a catch 9 which is adapted to spring into engagement with the lower side of the plate 1 adjacent the aperture 2. The tension bar is preferably constructed of spring steel wire, which allows the end 7 to spring slightly to properly engage the plate 1 and form a spring catch as best illustrated in Fig. 4. Mounted on the horizontal portion of the tension bar 4 I provide a cam lever 10 which is adapted to rotate and slide freely on said tension bar. This cam lever is provided with the cam 11, which is adapted to engage the top of the plate 2.

The operation of the device is as follows: When it is desired to place a patch on an inner tube, the tube 12 is placed on the plate 1 as shown in Fig. 1. The patch 13 is then placed in position with the proper adhesive substance thereon and then the plate 5 is swung around using the perpendicular end portion 6 as a pivot. The perpendicular end portion 7 is then forced down through the opening 2 in the plate 1 where it locks itself in position. The cam lever which is in the position shown in Fig. 2 is then operated so that it assumes the position shown in Fig. 3, where it is seen that the tube is clasped tightly between the plates 1 and 5, thereby applying uniform pressure to the patch at every point. After the device has been allowed to remain on the tube a sufficient length of time for the patch to have thoroughly adhered to the tube, the cam lever is raised, thereby releasing the pressure of the plates on the tube and the latch 9 on the end 7 of the tension bar is released allowing the tension bar and plate 5 to be swung back, thereby allowing the tube to be removed.

Thus it is seen that I produce a simple device which can be quickly applied to a patched tube without having to adjust screws or bolts, and with which pressure can be applied almost instantaneously after the tube and plates are in proper position for applying the pressure by means of the cam lever 10.

Certain modifications of my invention can be made without departing from its spirit and scope, and I do not wish to be confined to the exact details shown.

What I claim as new and desire to secure by Letters Patent is:—

In a device for clamping patches on tires, the combination with two pressing plates having apertures therein diametrically opposite each other, a tension bar passing through the apertures on one side of the plates and bent to form a hinge to allow said plates to be moved in planes parallel with each other, a downwardly extending portion on said tension bar having a notch therein for engagement with the lower plate, said extension passing through the apertures in said plates opposite the hinge to lock said plates together, of means on said tension bar for forcing said plates together to press a tire therebetween, substantially as set forth.

JOSEPH S. SACKETT.

Witnesses:
OLIVER W. SHARMAN,
WILLIAM BOERS.